United States Patent
Liu et al.

(10) Patent No.: US 10,601,030 B2
(45) Date of Patent: Mar. 24, 2020

(54) FUNCTIONAL POLYMER BINDER FOR SULFUR CATHODE FABRICATION

(71) Applicants: Gao Liu, Piedmont, CA (US); Min Ling, Albany, CA (US); Changan Yang, Albany, CA (US)

(72) Inventors: Gao Liu, Piedmont, CA (US); Min Ling, Albany, CA (US); Changan Yang, Albany, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/052,541

(22) Filed: Aug. 1, 2018

(65) Prior Publication Data
US 2018/0351161 A1    Dec. 6, 2018

Related U.S. Application Data

(63) Continuation of application No. PCT/US2017/015990, filed on Feb. 1, 2017.
(Continued)

(51) Int. Cl.
*H01M 6/18* (2006.01)
*H01M 4/137* (2010.01)
(Continued)

(52) U.S. Cl.
CPC ............. *H01M 4/137* (2013.01); *B32B 37/06* (2013.01); *C08F 220/34* (2013.01);
(Continued)

(58) Field of Classification Search
CPC ........ H01M 4/137; H01M 4/38; H01M 4/382; H01M 4/608; H01M 4/622; H01M 10/052; H01M 2004/028
See application file for complete search history.

(56) References Cited

U.S. PATENT DOCUMENTS 6,652,440 B1   11/2003   Kovalev et al.
6,730,440 B1   5/2004   Bauer et al.
(Continued)

OTHER PUBLICATIONS

Patent Cooperation Treaty, PCT/US2017/015990, "PCT Notification of Transmittal of the International Search Report and the Written Opinion of the International Searching Authority, or the Declaration." ISA, including Forms PCT/ISA/220, 210, and 237 (2017).

(Continued)

*Primary Examiner* — Jane J Rhee

(57) ABSTRACT

The present invention provides for a composition of matter, polymeric conductive binder, or electrode comprising:

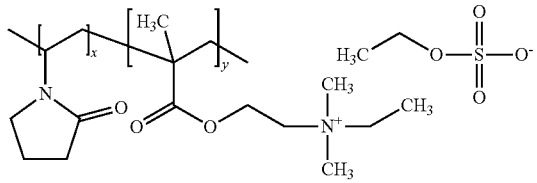

Poly[(2-ethyldimethylammonioethyl methacrylate ethyl sulfate)-co-(1-vinylpyrrolidone)]. The present invention also provides for a Lithium-Sulfur (Li—S) battery comprising a cathode comprising: a cathode comprising a polymeric conductive binder poly[(2-ethyldimethylammonioethyl methacrylate ethyl sulfate)-co-(1-vinylpyrrolidone)]; a separator; an anode; and, an electrolyte.

3 Claims, 8 Drawing Sheets

Related U.S. Application Data (60) Provisional application No. 62/289,456, filed on Feb. 1, 2016.

(51) Int. Cl.
*H01M 4/62* (2006.01)
*H01M 10/052* (2010.01)
*B32B 37/06* (2006.01)
*H01M 4/38* (2006.01)
*C08F 226/10* (2006.01)
*C08F 220/34* (2006.01)
*C08G 75/14* (2006.01)
*C08L 81/04* (2006.01)
*H01M 4/60* (2006.01)
*H01M 4/02* (2006.01)

(52) U.S. Cl.
CPC ............ *C08F 226/10* (2013.01); *C08G 75/14* (2013.01); *C08L 81/04* (2013.01); *H01M 4/38* (2013.01); *H01M 4/382* (2013.01); *H01M 4/608* (2013.01); *H01M 4/622* (2013.01); *H01M 10/052* (2013.01); *H01M 2004/028* (2013.01)

(56) References Cited

U.S. PATENT DOCUMENTS

| | | |
|---|---|---|
| 2004/0043291 A1 | 3/2004 | Kim et al. |
| 2011/0123850 A1* | 5/2011 | Duong ................ H01M 2/1686 429/145 |
| 2012/0052401 A1 | 3/2012 | Goodenough et al. |
| 2012/0189896 A1 | 7/2012 | Zhou et al. |
| 2015/0044550 A1 | 2/2015 | Park et al. |

OTHER PUBLICATIONS

Liu et al., "A simple route for preparation of highly stable CuO nanoparticles for nonenzymatic glucose detection." Catalysis Science & Technology, vol. 2, pp. 813-817 (2012).

Liu et al., "Nucleophilic substitution between polysulfides and binders unexpectedly stabilizing lithium sulfur battery," Nano Energy 38 (2017) 82-90.

J. Chao, "A Seaweed Derivative Could Be Just What Lithium-Sulfur Batteries Need," News Release, Lawreence Berkeley National Laboratory, published Jun. 13, 2017, https://newscenter.lbl.gov/2017/06/13/seaweed-derivative-just-lithium-sulfur-batteries-need/, downloaded Jul. 10, 2018.

G Al et al., "Biomimetic Ant-Nest Electrode Structures for High Sulfur Ratio Lithium-Sulfur Batteries," Nano Lett. Sep. 14, 2016;16(9):5365-72.

* cited by examiner

FUNCTIONAL POLYMER BINDER FOR SULFUR CATHODE FABRICATION

CROSS REFERENCE TO RELATED APPLICATIONS

This application claims priority as a continuation application of PCT International Patent Application No. PCT/US17/15990, filed Feb. 1, 2017, which claims priority to U.S. Provisional Patent Application Ser. No. 62/289,456 filed Feb. 1, 2016, wherein both are incorporated herein by reference as if fully set forth in their entireties.

STATEMENT OF GOVERNMENTAL SUPPORT

The invention was made with government support under Contract No. DE-AC02-05CH11231 awarded by the U.S. Department of Energy. The government has certain rights in the invention

BACKGROUND OF THE INVENTION

Field of the Invention

The present invention relates to the field of Lithium-Sulfur (Li—S) Batteries.

Related Art

Lithium-sulfur (Li—S) has the highest theoretical specific and volumetric energy densities of any rechargeable battery chemistry (2550 Wh/kg and 2862 Wh/L). The best Li—S batteries can offer around 350 Wh/kg and 320 Wh/L currently, which is still significantly better than LIBs (150-200 Wh/kg). The high capacity is based on the conversion reaction of sulfur to form lithium sulfide ($Li_2S$) by reversibly incorporating two electrons per sulfur atom compared to one or less than one per transition-metal ion in insertion oxide cathodes. A sulfur cathode suffers from poor cyclability, which is mainly due to the shuttling effect of polysulfides and low conductivity. To unlock this potential battery, efforts have been made such as carbon accommodation/coating, electrolyte additives, membrane and lithium anode modification, however, none of these were commercially available until now. The efforts for developing high-performance lithium sulfur batteries can be generalized as follows.

Appropriate dispersion of active sulfur: Although the solid-phase sulfur transforms into soluble polysulfides during cycling and changes its initial morphology, the utilization of the active material will be low if sulfur has insufficient contact with conductive agents;

Efficient absorbing materials: Novel multi-functional and porous materials need to be designed for effectively absorbing and accommodating the active material;

Stable electrolyte system: A more reliable electrolyte is preferred to have a controlled dissolution of the polysulfides and to be compatible with the lithium metal anode;

Safe anode materials: A lithium metal anode in liquid electrolytes poses safety concerns due to lithium dendrite development during cycling. To address this problem, use of a protected lithium metal anode or alternative Li/M (M=Si, Sn, C, etc.) alloys is a feasible approach for building a safer lithium sulfur battery.

Since divinyloxyhydroxyolysulfides was first developed as an alternative binder for Li—S batteries, polymers including gelatin, polyethylene oxide, polyacrylic acid, carboxyl methyl cellulose, polyvinylpyrrolidone and carbonyl-β-cyclodextrin were identified as promising binders to address this shuttle issue. Besides the better dispersion and distribution properties, the existence of carbonyl groups play a pivotal role in the improved cycle performance. The electron-rich oxygen with lone pairs is favourable to form lithium-oxygen (Li—O) bond with lithium polysulfides. This phenomenon was further verified by the carbonylation reaction of β-cyclodextrin. The introduction of carbonyl groups promoted the electrochemical performance of sulfur electrode.

BRIEF DESCRIPTION OF THE INVENTION

The present invention provides for a composition of matter comprising a polymer having the structure:

(Formula 1)

Poly[(2-ethyldimethylammonioethyl methacrylate ethyl sulfate)-co-(1-vinylpyrrolidone)].

The present invention also provides for a polymeric conductive binder comprising a polymer having the structure:

(Formula 1)

Poly[(2-ethyldimethylammonioethyl methacrylate ethyl sulfate)-co-(1-vinylpyrrolidone)].

The present invention also provides for an electrode comprising: a polymeric conductive binder having the structure:

(Formula 1)

Poly[(2-ethyldimethylammonioethyl methacrylate ethyl sulfate)-co-(1-vinylpyrrolidone)].

The present invention also provides for a Lithium-Sulfur (Li—S) battery comprising:
(a) a cathode further comprising a polymeric conductive binder having the structure:

(Formula 1)

Poly[(2-ethyldimethylammonioethyl methacrylate ethyl sulfate)-co-(1-vinylpyrrolidone)];
(b) a separator;
(c) an anode; and
(d) an electrolyte.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

In the discussions that follow, various process steps may or may not be described using certain types of manufacturing equipment, along with certain process parameters. It is to be appreciated that other types of equipment can be used, with different process parameters employed, and that some of the steps may be performed in other manufacturing equipment without departing from the scope of this invention. Furthermore, different process parameters or manufacturing equipment could be substituted for those described herein without departing from the scope of the invention.

These and other details and advantages of the present invention will become more fully apparent from the following description taken in conjunction with the accompanying drawings.

Herein, we demonstrate a class of innovative polymer binder materials and strategy to address the challenge of polysulfides dissolution and the shuttle effect. A series of functional polymers with potential to have nucleophile reaction with polysulfides were designed to retain polysulfide in the surface electrode. The number of factors governing reactivity in nucleophilic reaction includes polarizabilities of both nucleophile and leaving group, stability of leaving group and interaction between nucleophile and leaving group. To capture the polysulfides, the choice of leaving group is the key issue. Nucleophile reaction involving good leaving groups has low activation barriers. A good leaving group must be able to stabilize a large negative charge in the transition state and product. A good measure of anion stability is the pKa of an anion's conjugate acid, with lower pKaH's being associated with better leaving group ability. Based on this, sulfate and halide ions, e.g., F, Cl, Br, I, and related polymers were adopted. The other important factor for the nucleophilic reaction is the location of leaving groups. The leaving groups at the primary carbon are preferred rather than at the secondary carbon, and the least preferred is at the tertiary position.

Examples of detailed mechanisms are illustrated in scheme 1.

Scheme 1.
Chemical capture of diffusing lithium polysulfides through nucleophilic attack of lithium polysulfide to sulfate and halide ions in DOL/DME electrolyte. A. polyvinylsulfate (PVS).
B. λ-carrageenan (MPS). C. Poly(epichlorohydrin) (PECH),
D. Polyvinyl Chloride (PVC), E. Poly(epibromohydrin) (PEBH)
F. Poly(epiiodhydrine (PEIH)

Based on the above polymers illustrated in scheme 1, we built and tested high areal capacity electrodes which could buffer the polysulfides shuttle effect and help to maintain the mechanical integrity of the sulfur electrode. A simple, cheap, scalable and versatile way was chosen to obtain sulfur electrodes with high binding capability, the property gain in terms of electrochemical performance (high areal capacity with high current density) is demonstrated, which proves our approach that an effective binder is a key factor to improve the loading of sulfur electrodes. This discovery will enable high capacity, low cost and large scale production of Li—S cells based on binders. The strategy developed here may also be applied to other rechargeable battery systems.

In various embodiments, we show a polymer strategy with sulfate and halide ions groups that can provide effective binding sites for lithium polysulfides. The strategy of this approach is not only to limit the outbound diffusion of the soluble $Li_2S_n$ molecules, but also to capture the soluble species in the electrolyte to alleviate the polysulfides shuttle effect to achieve commercial promising cycle performance.

To execute this method, micro-sulfur powders were mixed with conductive additives (acetylene black, e.g. super C$_{65}$) through various binders to form slurry. The slurry was then coated onto an aluminum foil using doctor blade and dried vacuum to form the working electrode. Li—S batteries are tested with 2325-type coin cell (National Research Council Canada) in an argon-filled glove box using lithium foil as the counter electrode. The size of the sulfur electrode and counter-electrode lithium metal disk is ½ and $^{11}/_{16}$-in. OD, respectively. The Li foil is purchased from FMC-Lithium Co. The separator is polypropylene film (Celgar 2400). The electrolyte used was a freshly prepared solution of lithium bis(trifluoromethanesulfonyl)imide (1M) in 1:1 v/v 1,2-dimethoxyethane and 1,3-DOL containing LiNO$_3$ (2 wt %). The assembled cells were placed on the channels (Maccor Inc.; Tulsa, Okla.) at 30° C. for lithiation-delithiation cycles. The voltage window for cell test is 1.8-2.6 V.

The nucleophilic reaction initiates the connection since the reduction of elemental sulfur to high-order soluble polysulfide resulting in shuttle effect alleviation. Raman spectra in FIG. 1A verify the evolution including leave of sulfate groups and formation of C—S single bond in the intermediate molecules. The peak corresponds to the $v_{SO_4^{2-}}$ is centered at 981 cm$^{-1}$. The appearance of peak at 675 cm$^{-1}$ confirmed the C—S bonding. After mechanism clarification, excellent cyclability with micro-sulfur particles was demonstrated based on PVS at room temperature. The cathode shows high initial discharge capacity of ca. 1500 mAh/g (based on the incorporated sulfur content) with 100% of coulombic efficiency after a few initial cycles. The cathode capacity can hold up to 900 mAh/g after 100 cycles. The capacity retention for PVS based electrode is clearly more advantageous at C/20 than a PVDF based electrode. Since the unique variable between PVS and PVDF is sulfate and fluorine, the effect of sulfate can be confirmed accordingly. This observation confirms that the PVS has extremely strong chemical bonding with diffusing polysulfides to achieve improved cycle performance.

Figure 1A:
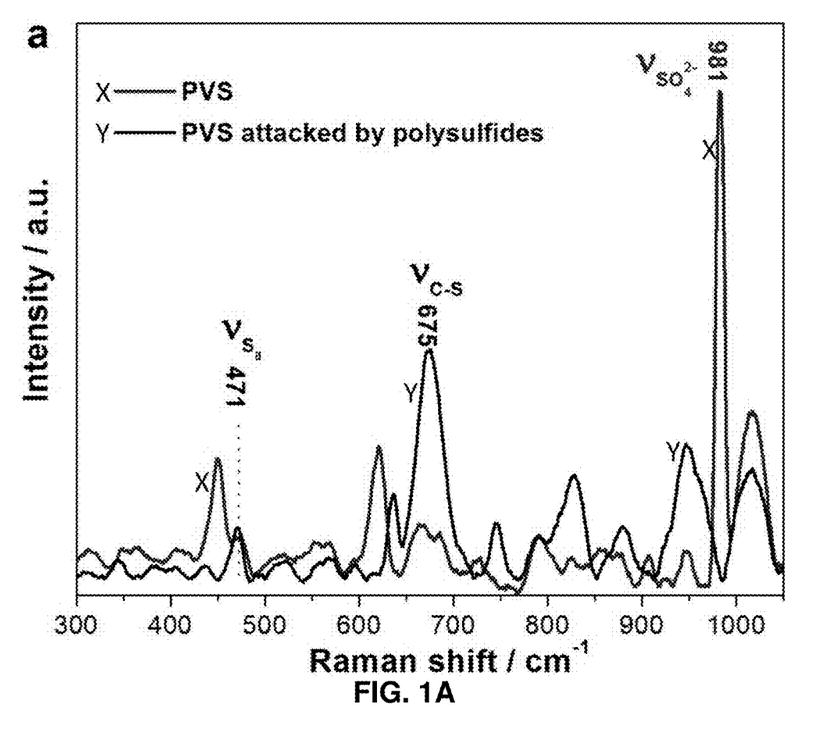
FIG. 1A illustrates C—S single bond formation between polyvinylsulfate (PVS) and polysulfides evidenced by Raman spectra.
Figure 1B:
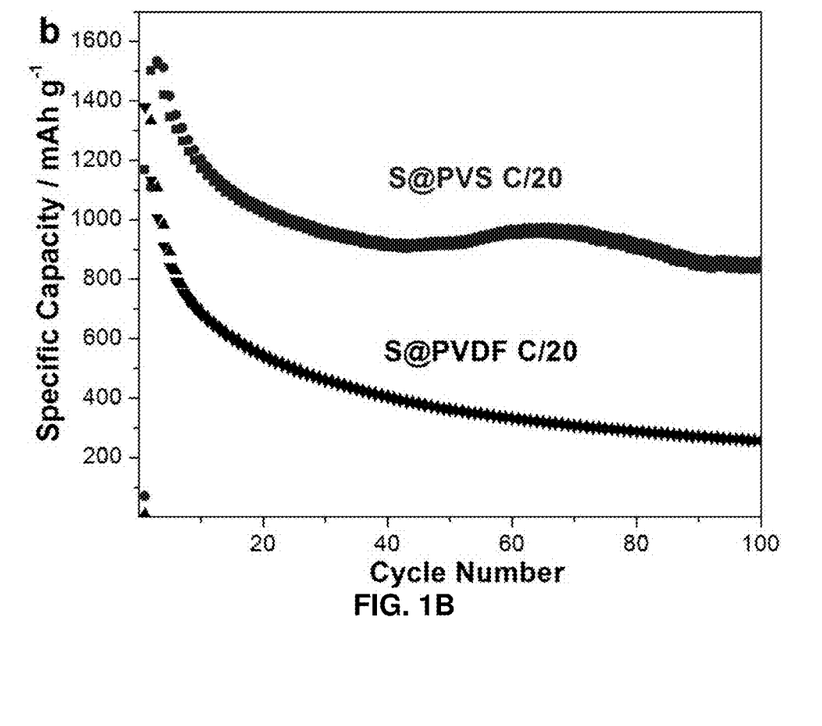
FIG. 1B illustrates polysulfide reservation capability comparison between PVS and PVDF through low rate cycling performance.

FIG. 1A illustrates C—S single bond formation between PVS and polysulfides evidenced by Raman spectra. FIG. 1B illustrates polysulfide reservation capability comparison between PVS and PVDF through low rate cycling performance.

High Areal Capacity Based on λ-Carrageenan (MPS).

Figure 2A:
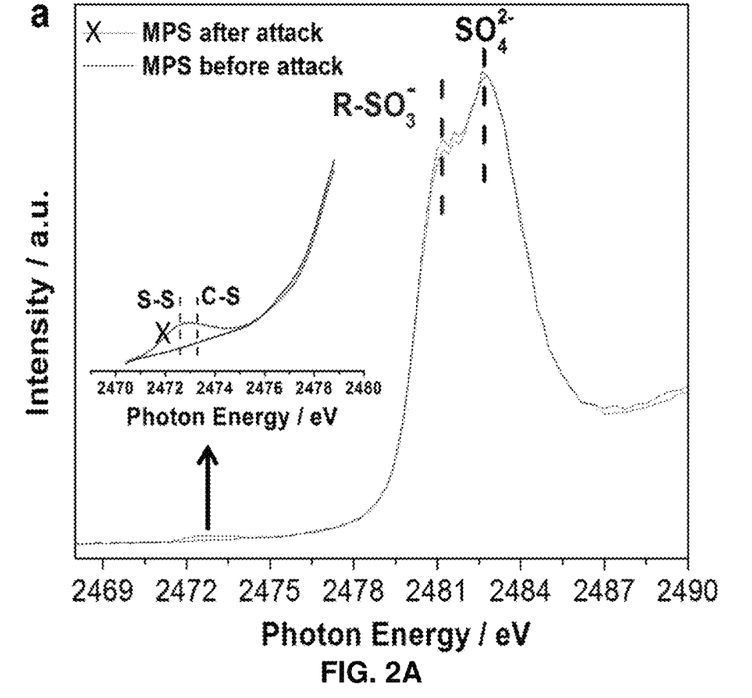
FIG. 2A illustrates characterization of chemical bonds between MPS and polysulfide: TFY spectra.
Figure 2B:
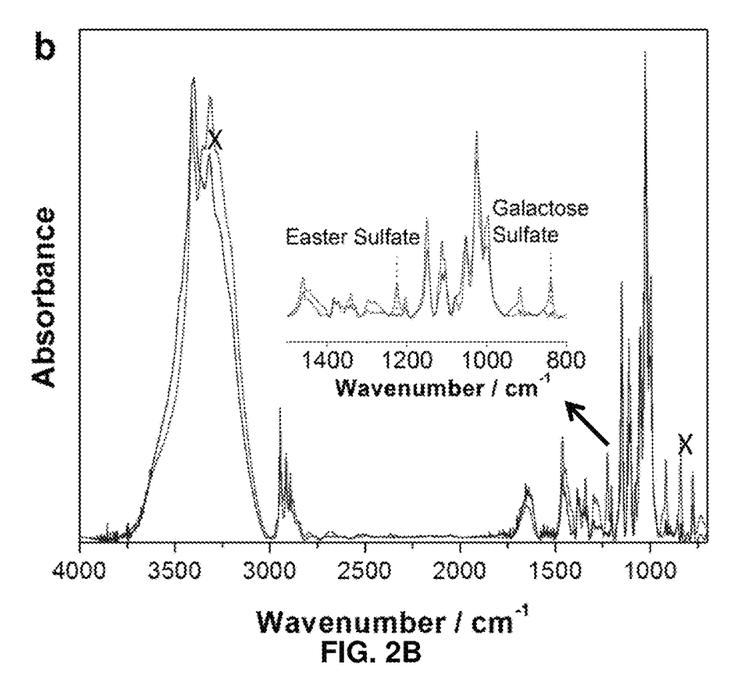
FIG. 2B illustrates characterization of chemical bonds between MPS and polysulfide: FTIR spectra.

FIGS. 2A and 2B illustrate characterization of chemical bonds between MPS and polysulfide. FIG. 2A illustrates TFY spectra. FIG. 2B illustrates FTIR spectra.

To extend the sulfate function in PVS and a simplified manufacturing process, a sulfated natural polymer λ-carrageenan (MPS), with high binding strength was evaluated to achieve high sulfur loading. The chemical bonding between MPS and polysulfides was initially verified as PVS. We applied S K-edge absorption spectra (XAS) to monitor the formation of chemical bonds between MPS and S. We simulated sample preparation processes by thermally treating in the DOL/DME electrolyte for 24 hours. The S K-edge XAS data of the mixtures recorded from the total fluorescence yield (TFY) before and after the treatment are presented in FIG. 2A. Before annealing, TFY spectra show peaks located at 2481.17 and 2483.56 are attributed to the R—SO$_3^-$$_{O-So*}$ and SO$_4^{2-}$$_{C-So*}$, respectively. The emerging peak at 2473.67 after treatment confirms the existence of C—S bond in the bulk material. In order to investing the evolution of the chemical bonding, Fourier Transform Infrared Spectroscopy (FTIR) was performed to demonstrate the leaving of sulfate group and forming of C—S bond. The decrease of easter sulfate and galactose sulfate vibration is indicated in FIG. 2B.

Figure 3A:
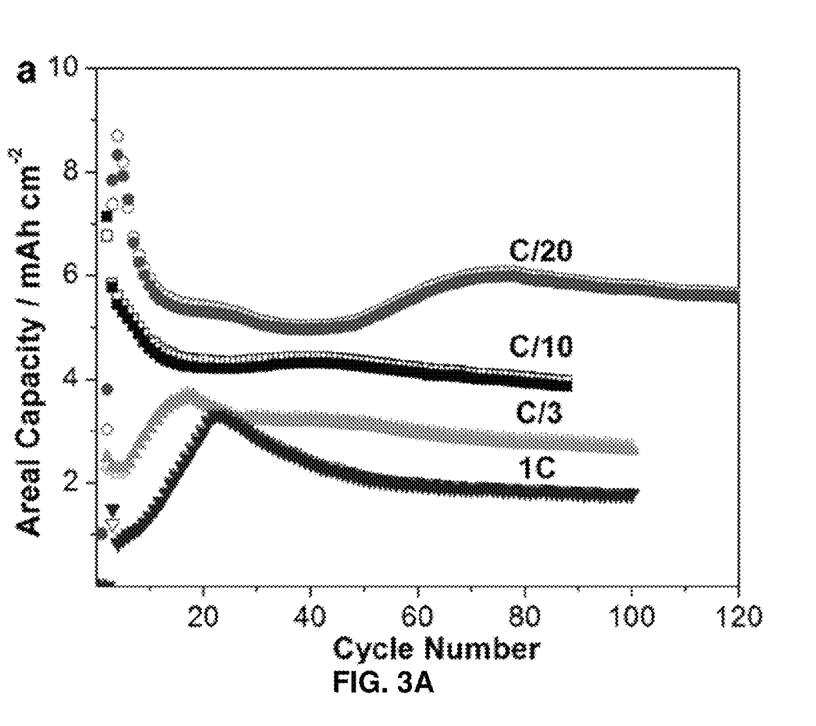
FIG. 3A illustrates cycling performance of high-loading sulfur electrodes based on MPS at varying C rates.
Figure 3B:
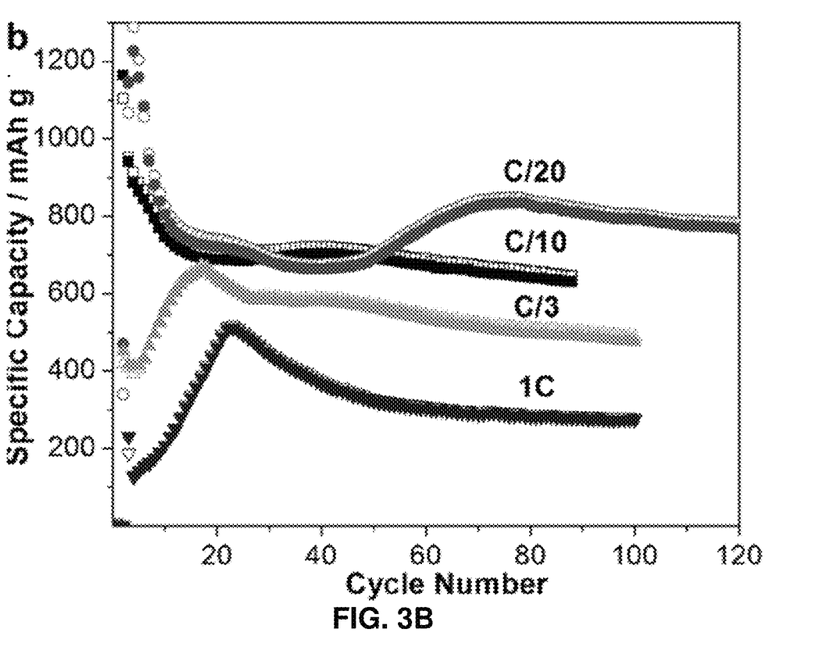
FIG. 3B illustrates cycling performance of high-loading sulfur electrodes based on MPS at varying C rates.
Figure 3C:
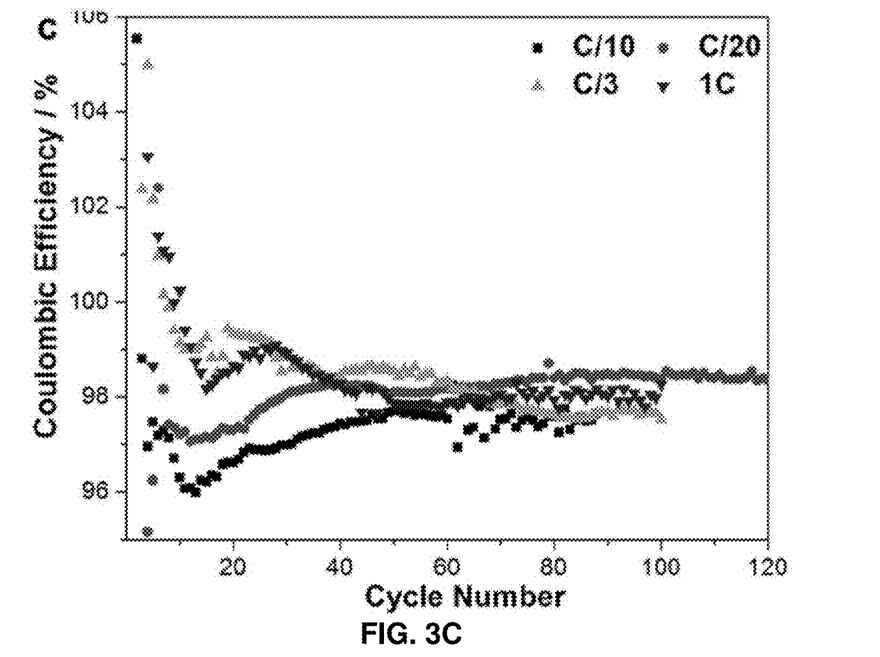
FIG. 3C illustrates coulombic efficiency of various C rate.

FIGS. 3A and 3B illustrate cycling performance of high-loading sulfur electrodes based on MPS at vary C rates. FIG. 3C illustrates Coulombic efficiency and FIG. 3D illustrates discharge/charge voltage profiles of various C rate.

Figure 3D:
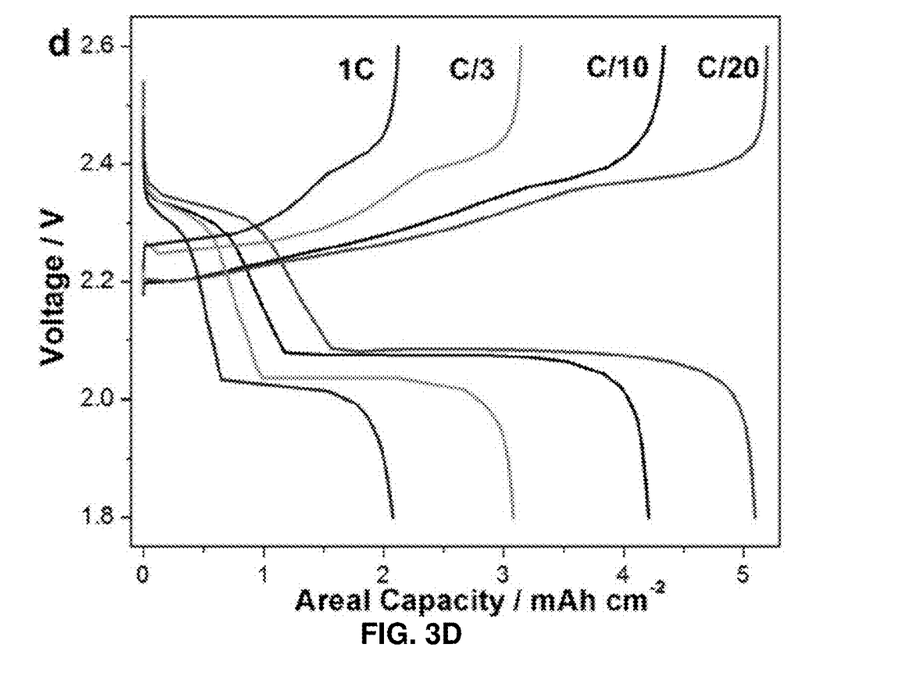
FIG. 3D illustrates discharge/charge voltage profiles of various C rate.

To confirm the expected cycle performance of the high loading sulfur electrodes, the galvanostatic charge/discharge profiles are shown in FIGS. 3A, 3B, 3C, and 3D. With MPS, the electrodes suffer both capacity fading and an increasing divergence between the charge and discharge capacity as a result of the polysulfide shuttle mechanism. A discharge capacity of 8.8 mAh/cm² is achieved after the electrolytes penetrate the thick electrodes, afterwards, the capacity is maintained at around 6 mAh/cm² for more than 120 cycles, corresponding to a specific capacity of around 850 mAh/g (FIGS. 3A and 3B). Specifically, the capture of polysulfides is well evidenced by the cycle performance at 0.05 C. In comparison, cells based on PVDF binder suffered from rapid capacity decay, indicating a greater degree of polysulfides dissolution into the electrolyte. The average Coulombic efficiency based on MPS is calculated to be more than 96% over 100 cycles, which shows little shuttle effect owing to polysulfides dissolution (FIG. 3C). As shown in FIG. 3d, two well-defined discharge plateaus were observed, which could be assigned to the multistep reduction mechanism of elemental sulfur.

Figure 4:
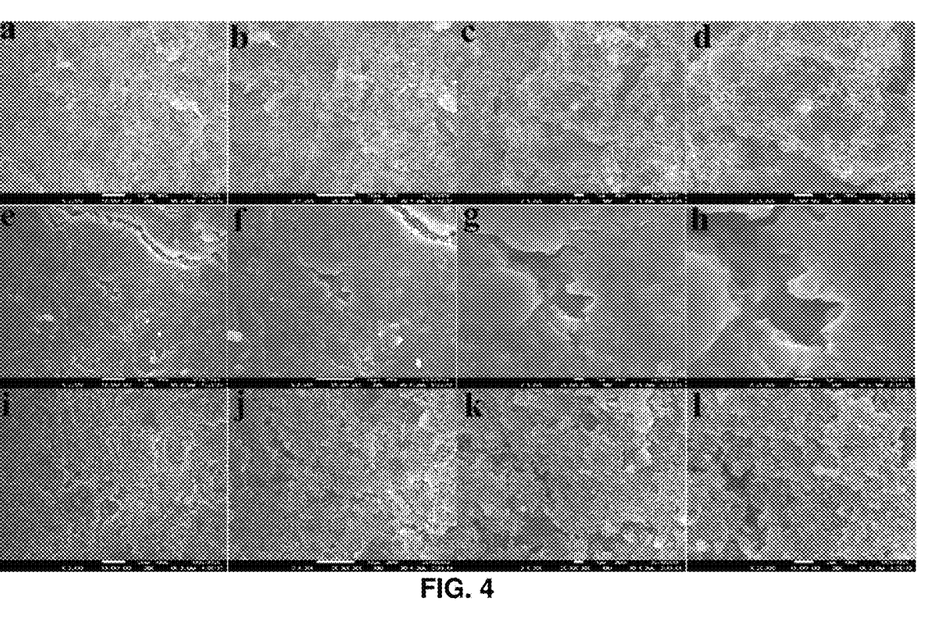
FIG. 4 illustrates SEM images of sulfur electrodes with different magnification. Fresh sulfur electrode (a, b, c, d); fully discharged electrode (e, f, g, h); Fully charged electrode (i, j, k, l). (Magnification: a, c. e 1200×; b, f, J 2000×; c, g, k 5000×; d, h, l 10000×).

To track the morphology evolution during lithiation/delithiation process, the scanning electron microscopy (SEM) images are shown in FIG. 4. A clear porous structure is performed at vary scale for fresh electrode before cycle. When the cells are disassembled at fully discharged state, no delamination is observed in the electrode and none of the reddish color electrolyte, which is typical color of polysulfides. A homogeneous $Li_2S$ precipitation is observed at the top of the electrode, indicating good conductivity of the electrode. Moreover, the good reversibility is well evidenced through the decomposition of $Li_2S$ layer after fully charged. The sulfur and carbon elemental maps also clearly demonstrate that sulfur is homogeneously distributed in the framework of electrode. The increasing content of oxygen after discharge is supposed to be attributed by the leaving sulfate group from the bulk electrode.

FIG. 4 illustrates SEM images of sulfur electrodes with different magnification. Fresh sulfur electrode (a, b, c, d); fully discharged electrode (e, f, g, h); Fully charged electrode (i, j, k, l). (Magnification: a, c. e 1200×; b, f, J 2000×; c, g, k 5000×; d, h, l 10000×).

Figure 5:
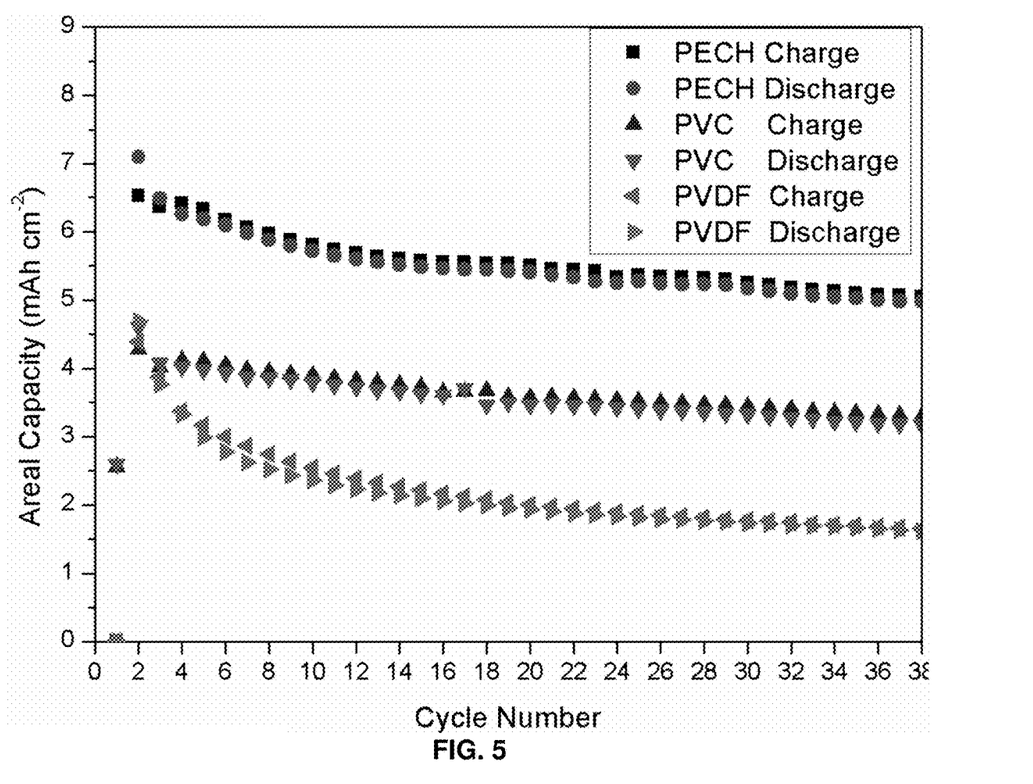
FIG. 5 illustrates cycling performance of high-loading sulfur electrodes based on PECH, PVC and PVDF.

The molecular structure of Poly(epichlorohydrin) (PECH) and Polyvinyl Chloride (PVC) is demonstrated in scheme 1. In comparison with PVDF, the chloro group is at the primary carbon position in PECH. Therefore, the chloro group is more active than that of PVC. This will facilitate the nucleophilic attack by polysulfide to PECH. The effect is verified by the comparison of the cycle performance as shown in FIG. 5. The PECH binder based sulfur electrode can achieve around 2 times of the areal capacity than that of the PVC binder based sulfur electrode.

In summary, an innovative class of polymer binders and simple electrode fabrication strategy is first successfully applied to solve the lithium sulfides shuttle effect through nucleophilic attack formed carbon-sulfur (C—S) bonding. The function of the C—S bonding is evidenced by the achieved areal capacity, i.e., 6 mAh/cm², for more than 100 cycles at C/20. The Coulombic efficiency is maintained up to 96% during the cycling. The nucleophilic attack during the lithiation/delithiation is monitored through Raman, TFY and FTIR spectroscopies. This low cost and efficient design is of significance for the progress of lithium-sulfur batteries.

Polymeric systems bearing positive charges are synthesized in the presence of novel cationic entities, incorporated on their backbone and/or as side chains, are considered as cationic polymers. Poly(vinylbenzyl chloride)-co-poly(vinylbenzyl trimethylammonium chloride) (PVBNC) and Poly[(2-ethyldimethylammonioethyl methacrylate ethyl sulfate)-co-(1-vinylpyrrolidone)] are promising cationic polymers since its low cost and wide application. (Scheme 2 and 3) As illustrated above, the dissolution and shuttle effect of polysulfides intermediate produced after lithiation/delithiation is the most challenging issue for lithium sulfur batteries. Cationic polymers have the potential to ionically bonded with polysulfides anions.

Figure 6A:
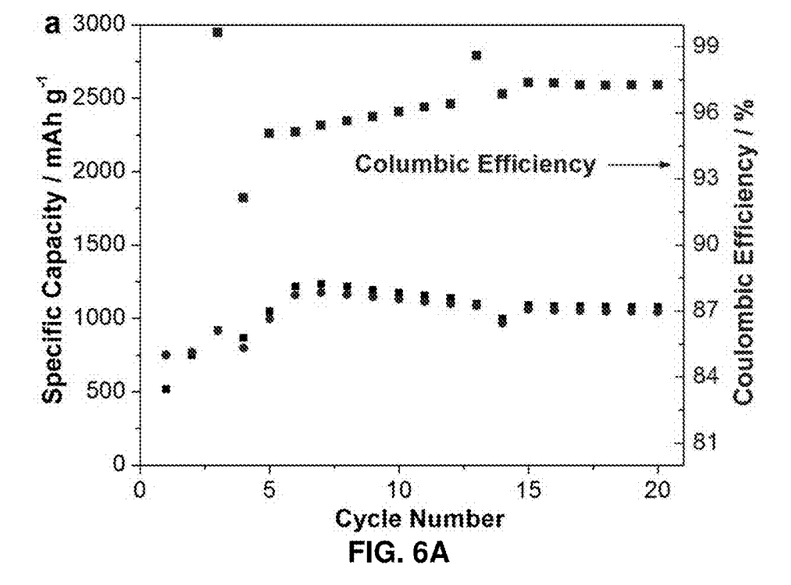
FIG. 6A illustrates cycling performance of high-loading sulfur electrodes based on Poly[(2-ethyldimethylammonioethyl methacrylate ethyl sulfate)-co-(1-vinylpyrrolidone)] at C/20.
Figure 6B:
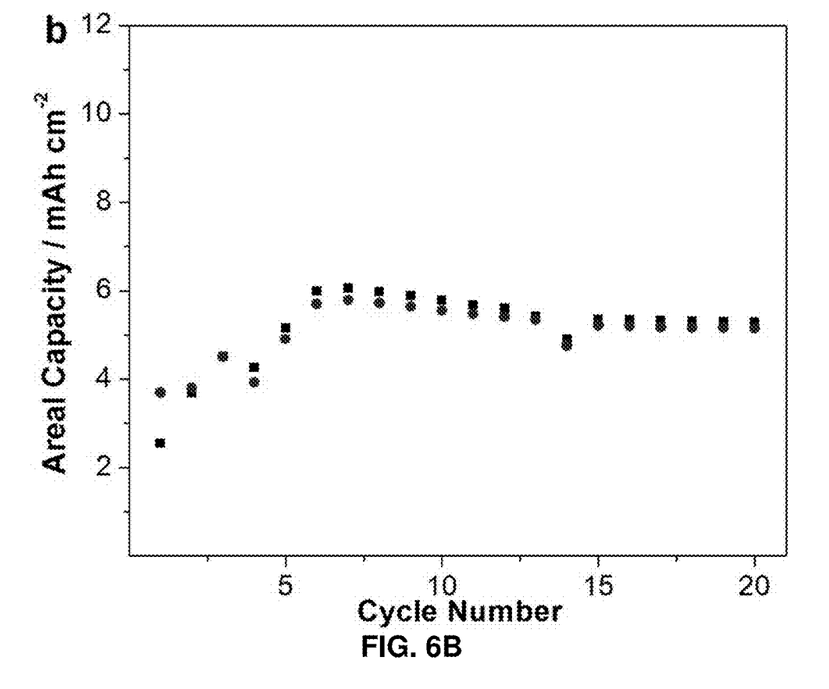
FIG. 6B illustrates cycling performance of high-loading sulfur electrodes based on Poly[(2-ethyldimethylammonioethyl methacrylate ethyl sulfate)-co-(1-vinylpyrrolidone)] at C/20.

FIGS. 6A and 6B illustrate cycling performance of high-loading sulfur electrodes based on Poly[(2-ethyldimethylammonioethyl methacrylate ethyl sulfate)-co-(1-vinylpyrrolidone)] C/20.

Figure 7:
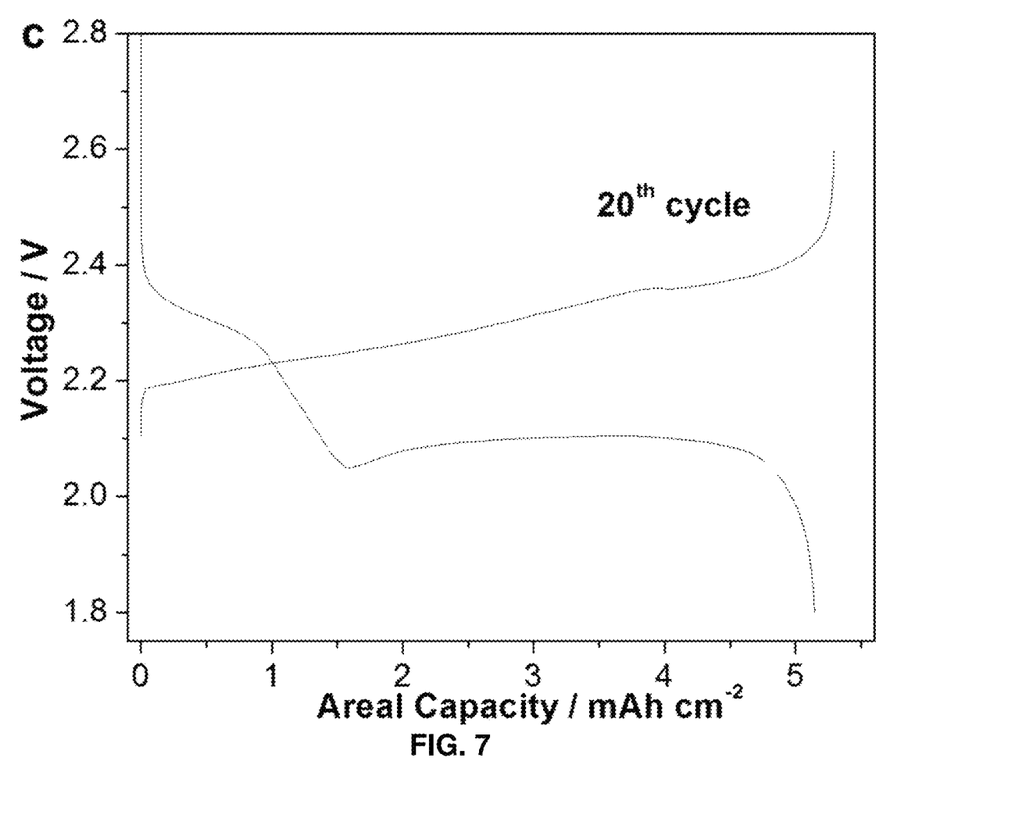
FIG. 7 illustrates cycling performance of high-loading sulfur electrodes based on Poly[(2-ethyldimethylammonioethyl methacrylate ethyl sulfate)-co-(1-vinylpyrrolidone)] specifically the dis-charge/charge voltage profiles of the 20th cycle.

FIG. 7 illustrates cycling performance of high-loading sulfur electrodes based on Poly[(2-ethyldimethylammonioethyl methacrylate ethyl sulfate)-co-(1-vinylpyrrolidone)] specifically the dis-charge/charge voltage profiles of the 20th cycle.

The electrochemical performance of the sulfur electrode in FIGS. 6A, 6B, and 7 is based on cationic polymer Poly[(2-ethyldimethylammonioethyl methacrylate ethyl sulfate)-co-(1-vinylpyrrolidone)]. The specific capacity can be held for more than 1000 mAh/g for 20 cycles, meanwhile, the areal capacity is maintained above 5 mAh/cm². The cycle performance provides strong evidence of alleviation of polysulfides shuttle effect and promotion of sulfur utilization.

(Formula 1)

Scheme 2.

The molecular structure of Poly[(2-ethyldimethylammonioethyl methacrylate ethyl sulfate)-co-(1-vinylpyrrolidone)].

Scheme 3. Binder Poly(vinylbenzyl chloride)-co-poly(vinylbenzyl trimethylammonium chloride) (PVBNC) used for Sulfur electrode.

What is claimed is:

1. A polymeric conductive binder comprising:

(Formula 1)

Poly[(2-ethyldimethylammonioethyl methacrylate ethyl sulfate)-co-(1-vinylpyrrolidone)].

2. An electrode comprising:

a polymeric conductive binder (Formula 1)

Poly[(2-ethyldimethylammonioethyl methacrylate ethyl sulfate)-co-(1-vinylpyrrolidone)].

3. A Lithium-Sulfur (Li—S) battery comprising:

a cathode comprising a polymeric conductive binder (Formula 1)

Poly[(2-ethyldimethylammonioethyl methacrylate ethyl sulfate)-co-(1-vinylpyrrolidone)];
a separator;
an anode; and
an electrolyte.

* * * * *